United States Patent [19]

Mansell

[11] 4,405,232

[45] Sep. 20, 1983

[54] WAVE FRONT SENSING DEVICE

[75] Inventor: Dennis N. Mansell, Albuquerque, N. Mex.

[73] Assignee: United Technologies Corporation, Hartford, Conn.

[21] Appl. No.: 298,830

[22] Filed: Sep. 2, 1981

[51] Int. Cl.³ .............................................. G01J 1/20
[52] U.S. Cl. ..................................... 356/121; 250/201; 350/296
[58] Field of Search ................ 356/121, 152; 350/292, 350/293, 296, 434; 250/201; 372/99

[56] References Cited

U.S. PATENT DOCUMENTS

| 3,466,566 | 9/1969 | Patel | 372/99 |
| 3,759,590 | 9/1973 | Arnaud | 350/434 |
| 3,980,879 | 9/1976 | O'Meara | 250/201 |
| 4,141,652 | 2/1979 | Feinleib | 356/121 |

Primary Examiner—R. A. Rosenberger
Attorney, Agent, or Firm—Eric W. Petraske

[57] ABSTRACT

The disclosure illustrates a wave front sensing device of the Hartman sensor type in which a number of concentric toroidal surfaces machined in a single substrate reflect light into a series of corresponding ring foci which foci impinge on an array of linear optical detectors.

3 Claims, 5 Drawing Figures

WAVE FRONT SENSING DEVICE

DESCRIPTION

1. Technical Field

The field of the invention is that of measuring the wave front of a beam of laser radiation.

2. Background Art

It is known in the laser art to employ a device known as a Hartman sensor to measure the phase front quality of a laser beam. These devices conventionally consist of an array of lenses which focus small portions of the laser beam to a set of corresponding focal points. These focal points are detected by a corresponding array of quadrant optical detectors which transmit their output to a measuring system which compares the light intensity as various points on the beam with either a reference beam or with a set of nominal values. These sensors are used to detect and, in connection with an adaptive optical system, to correct for tilt in the optical wave front, the correct degree of focus, and the systematic correction of an optical beam to compensate for errors or deviations within the laser or within the atmosphere through which the laser beam travels. A chronic problem with these prior art devices has been aligning and maintaining in alignment the array of lenses and detectors.

DISCLOSURE OF INVENTION

The invention relates to a wave front measuring device in which a plurality of concentric toroidal mirrors reflect annular regions of a laser beam into circular focal lines. These focal lines impinge on an array of optical detectors for measuring the intensity of light at certain points along the line.

BEST MODE FOR CARRYING OUT THE INVENTION

Figure 1:
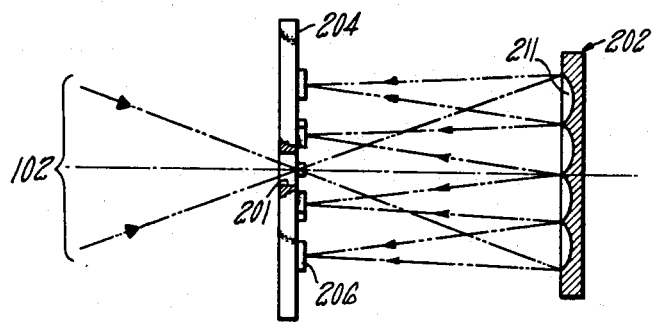
FIG. 1 illustrates an embodiment of the invention incorporating a single detector array.

In FIG. 1, beam 102 is a sample beam taken from a high power laser and brought to a focus in aperture 201 of detector support plate 204. The beam diverges from the focal point and strikes an array of mirrors 205 machined in substrate 202 which is positioned perpendicular to the optical axis of beam 102 at a definite position past the focal point. This array of circular concentric mirrors illustrated in perspective in FIG. 1b, reflects the sample beam back toward a detector array mounted on detector support 204, the mirrors having an elliptic surface in order to position the reflected radiation as desired. Each of mirrors 205 focuses an annular portion of beam 102 into a circular ring focal line 207 positioned at the surface of support 204 facing mirrors 205. These focal lines are intercepted by a number of linear detector arrays 206 which measure the intensity of light falling upon them and transmit to a central controlling device signals representative of that light intensity. The controlling device, which receives the measured light amplitudes and calculates therefrom the measured light intensity in order to control an adaptive optical system within the laser which generates beam 102, is conventional in the art and is omitted from the drawing for the sake of simplicity. Detectors 206 may be photodiodes, quadrant detectors, or linear detector arrays that are commercially available, a representative one being that made by E.G. & G. Reticon.

Figure 1A:
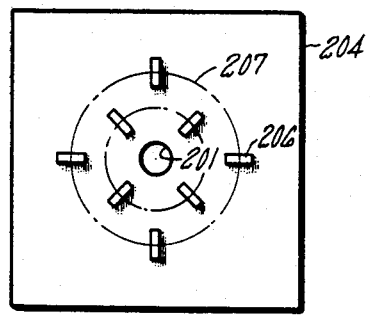
Figure 1B:
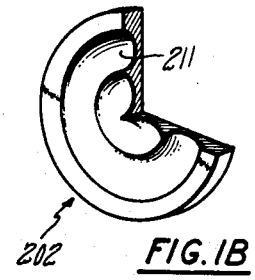

FIG. 1a illustrates the front surface of detector substrate 204 with detectors 206 placed on it, looking along the optical axis of beam 102 from the mirror surface toward detector surface 204. On this surface ring focus 207 intercepts the four linear detector arrays 206. These detector arrays typically have sensitive elements 0.001" in dimension spaced 0.001" apart that measure the intensity distribution of light impinging on them, from which information it is possible to compute by means of a weighted average the effective position of focal lines 207 and thus to compute the optical quality of the beam wave front. In this particular embodiment, the detectors are oriented along the radius from the center of the beam spot which passes through aperture 201 in substrate 204, and thus respond to deviations in the light beam along this radial dimension. The number of linear detectors 206 may, of course, be varied according to the requirements of the particular device in question. This radial information by itself is sufficient to compute the tilt of the output beam wave front by comparison with a set of values stored in the controller or by comparison with a high quality reference beam which is imposed on the detectors in alternation with the output beam to be measured.

Each of the detectors 206 measures only the distribution of light along one dimension and thus the information derived from this set of detectors is insufficient to perform a complete analysis of the beam phase front. It is possible, of course, to substitute for linear detectors 206 a corresponding array of detectors having a rectangular array of light sensitive elements, but these detectors are considerably more expensive and considerably slower in their response time than the linear detector arrays.

Figure 2:
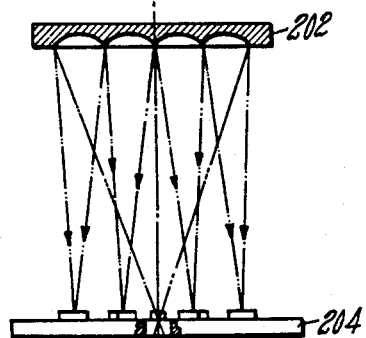
FIG. 2 illustrates an embodiment of the invention combining a pair of detector arrays.
Figure 2A:
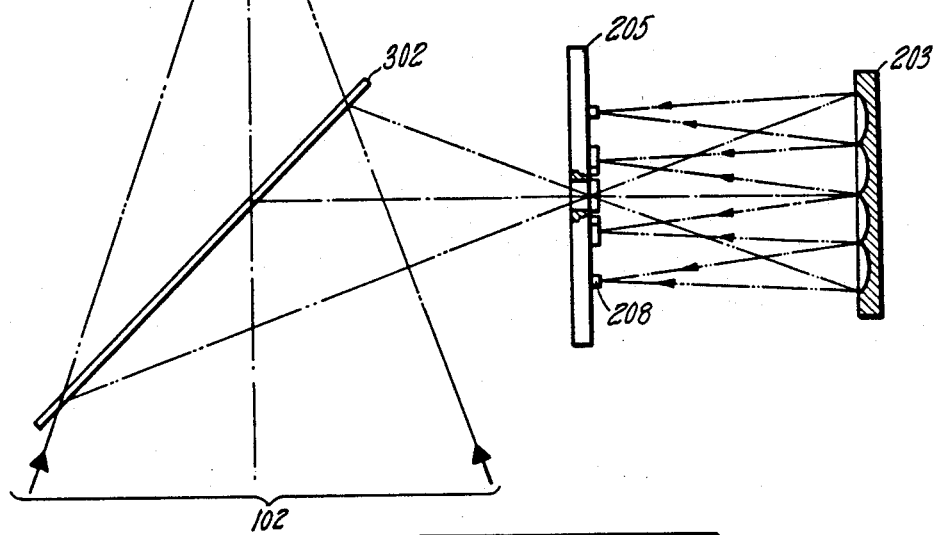
Figure 2A:
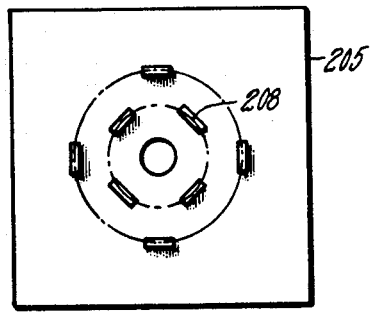

If it is necessary for a particular application to measure the light intensity in two dimensions or two directions at a single point, then the system of FIG. 2 may be employed. In FIG. 2, the detecting system includes mirror 202 and radial detector array 204, as before, together with a second mirror 203 and second detector array 205 to measure the light distribution in the azimuthal direction of the ring foci at points corresponding to the points measured by detector array 204. Beam 102 is split by beam splitter 302 into two portions which are directed to the two different detector arrays. FIG. 2a illustrates an arrangement of linear detectors to measure light distribution (and thus beam quality) along the azimuthal direction, in which a number of detectors 208 are disposed on substrate 205 in analogy with the detectors 206 on substrate 204. Such an array may be used together with an adaptive optical system to control a deformable mirror, for example, to compensate at a number of points for errors such as thermal blooming caused by transmission of the beam through the atmosphere. Such adaptive optical systems and deformable mirrors are well known to those skilled in the art and do not form part of this invention, which is directed at an improved detector.

Using the system illustrated in FIG. 2, the light intensity distribution in two orthogonal directions at corresponding points on the beam will be measured, and thus it is possible using conventional geometrical calculations to compute the wave front quality of the beam being sampled. This quality is then compared with either a reference beam of known high quality which is imposed on the detection system in alternation with the beam being sampled, or with a set of stored values for a nominal beam of known high quality. A deformable mirror within the laser may then be controlled in response to the measured signals in order to adjust the laser output beam to the same phase front as that of the reference beam.

It is an advantageous feature of the invention that the sets if toroidal mirrors may be relatively inexpensively machined in a single substrate by numerically controlled diamond turning so that the problem of maintaining a set of lenses in alignment is eliminated. It is a further advantageous feature that the linear detector arrays used in the preferred embodiment need not be maintained in accurate alignment with the sample beam and mirror array, for the method of comparison with a reference beam provides automatic correction of shifts in the position of the detectors.

It is yet another advantageous feature of the invention that the detector is not wavelength sensitive and is therefore adapted to use in chemical lasers, where conventional Hartman sensors do not work well.

I claim:

1. An optical device comprising:
   a detector plate having a plurality of optical detectors disposed on a first side thereof and an aperture of a predetermined size for permitting the passage along a beam axis of an optical beam therethrough;
   a substrate having a plurality of concentric circular mirrors thereon, said substrate being disposed along said optical axis so that said mirrors are centered on said axis, each of said mirrors having a reflective surface facing said first side of said detector plate and being configured in such a manner that an annular portion of said optical beam is focussed to a ring focus at a predetermined location on said first side, said plurality of optical detectors being disposed on said first side at predetermined locations such that each of said detectors responds to a portion of one of said ring foci.

2. A device according to claim 1, in which each of said mirrors has a cross section in the form of a portion of an ellipse and in which each of said plurality of optical detectors is a linear detector array oriented perpendicular to said ring focus for measuring the distribution of light in said ring focus along the radial direction of said ring focus.

3. A device according to claim 2, further including a beam splitter for deflecting a second beam along a second axis at a right angle to said optical axis, a second substrate having a plurality of second mirrors and a second detector plate, said second substrate and second mirror plate being disposed along said second axis in such a manner that said second beam is focussed to a second series of corresponding ring foci having the same relation to said second beam as said ring foci have to said optical beam, and in which device a plurality of azimuthal linear optical detector arrays are disposed on a first surface of said second detector plate in predetermined positions intercepting said second series of corresponding ring foci for measuring the light intensity distribution of said corresponding ring foci along the azimuthal direction of said corresponding ring foci.

* * * * *